US011528791B2

(12) United States Patent
Mao et al.

(10) Patent No.: US 11,528,791 B2
(45) Date of Patent: Dec. 13, 2022

(54) DRIVING CIRCUIT

(71) Applicant: CURRENT LIGHTING SOLUTIONS, LLC, East Cleveland, OH (US)

(72) Inventors: Zhu Mao, Shanghai (CN); Min Fang, Shanghai (CN); Zhangji Zhou, Shanghai (CN); Shuyi Qin, Shanghai (CN); Bo Zhang, Shanghai (CN); Fanbin Wang, Shanghai (CN)

(73) Assignee: CURRENT LIGHTING SOLUTIONS, LLC, Beachwood, OH (US)

( * ) Notice: Subject to any disclaimer, the term of this patent is extended or adjusted under 35 U.S.C. 154(b) by 0 days.

(21) Appl. No.: 17/287,812

(22) PCT Filed: Sep. 19, 2019

(86) PCT No.: PCT/CN2019/106572
§ 371 (c)(1),
(2) Date: Apr. 22, 2021

(87) PCT Pub. No.: WO2020/098372
PCT Pub. Date: May 22, 2020

(65) Prior Publication Data
US 2021/0385923 A1     Dec. 9, 2021

(30) Foreign Application Priority Data
Nov. 13, 2018   (CN) .......................... 201811346166.3

(51) Int. Cl.
*H05B 45/3725*     (2020.01)
*H02M 5/458*       (2006.01)

(52) U.S. Cl.
CPC ........ *H05B 45/3725* (2020.01); *H02M 5/458* (2013.01)

(58) Field of Classification Search
CPC .. H05B 45/30; H05B 45/3725; H05B 45/305; H02M 5/458
See application file for complete search history.

(56) References Cited

U.S. PATENT DOCUMENTS 8,629,631 B1   1/2014  Rhodes et al.
8,680,776 B1   3/2014  Mays et al.
(Continued)

FOREIGN PATENT DOCUMENTS

CN    101868094 A    10/2010
CN    102647823 A    8/2012
(Continued)

OTHER PUBLICATIONS

Office Action dated May 31, 2021 which was issued in connection with Chinese Application No. 201811346166.3 which was filed on Nov. 13, 2018.
(Continued)

*Primary Examiner* — Abdullah A Riyami
*Assistant Examiner* — Syed M Kaiser
(74) *Attorney, Agent, or Firm* — Buckley, Maschoff & Talwalkar LLC

(57) ABSTRACT

A driving circuit is provided in this present disclosure, the driving circuit includes a voltage input module, a quick start module and a control module. The voltage input module includes a first input terminal and a second input terminal and is configured to receive an alternating current voltage and convert the alternating current voltage into a direct current voltage. The quick start module is coupled to the voltage input module and configured to receive the direct current voltage and convert the direct current voltage into a startup voltage. The control module is coupled to the quick start module and configured to receive the startup voltage and control a load, wherein the quick start module comprises (Continued)

a first resistor and a second resistor connected in series and is coupled between the first input terminal and the control module.

10 Claims, 2 Drawing Sheets

(56) References Cited

U.S. PATENT DOCUMENTS

| | | |
|---|---|---|
| 9,225,189 B2 | 12/2015 | Wang et al. |
| 9,450,484 B2 | 9/2016 | Al-Shyoukh et al. |
| 9,912,228 B2 | 3/2018 | Al-Shyoukh et al. |
| 2008/0136335 A1 | 6/2008 | Chen et al. |
| 2009/0040793 A1 | 2/2009 | Huynh et al. |
| 2017/0367162 A1 | 12/2017 | Liu |
| 2018/0124889 A1 * | 5/2018 | Xiong ............... H05B 45/3725 |

FOREIGN PATENT DOCUMENTS

| | | | | |
|---|---|---|---|---|
| CN | 105873310 A | * | 8/2016 | |
| CN | 105873310 A | | 8/2016 | |
| CN | 205487279 U | * | 8/2016 | ........... G09G 3/3406 |
| DE | 102018203599 A1 | * | 9/2019 | |
| WO | WO-2004097866 A1 | * | 11/2004 | ............. H01F 38/14 |
| WO | WO-2007092003 A1 | * | 8/2007 | ............... F21K 9/00 |
| WO | 2016041122 A1 | | 3/2016 | |
| WO | WO-2017031919 A1 | * | 3/2017 | ......... H05B 33/0809 |

OTHER PUBLICATIONS

International Search Report and Written Opinion dated Dec. 19, 2019 which was issue in connection with PCT Application No. PCT/CN2019/106572—English translation provided.

* cited by examiner

DRIVING CIRCUIT

BACKGROUND

Embodiments of the present disclosure relate generally to a driving circuit, and more particularly relate to a driving circuit that can quickly start an LED lamp.

As a new generation light source, LED has advantages of energy saving, environmental protection, long life, diverse colors, stable beam concentration, and high electro-optical conversion rate. Therefore, in recent years, the use of LEDs as lighting sources has been a trend.

In the process of designing an LED to replace a conventional lighting source, it is necessary to ensure that startup time of the LED driver is less than one second. A traditional startup method is to start an integrated circuit by charging a power storage capacitor through a startup resistor. However, for a LED driving circuit with a high input voltage, the input voltage is usually 277V/480V. In order to achieve a faster startup speed at a low voltage, for example: 277V, a value of the startup resistor cannot be excessively large. This means that at a high voltage, such as 480V, since the startup resistor cannot be turned off after startup, there is still a large energy loss after startup. Conversely, if the value of the starting resistor is large, although the energy loss at high voltage is reduced, the starting speed at low voltage is greatly slowed down.

The current solution is to use a fly back or reverse topology driving circuit to speed up the startup time. This design is not only costly, but also heavy and bulky. In the case of limited internal space of the LED, the use of this design has limitation.

Therefore, it is desirable to provide a new driving circuit to address one or more of the above-mentioned situations.

BRIEF DESCRIPTION

In accordance with one embodiment disclosed herein, a driving circuit includes a voltage input module, a quick start module and a control module. The voltage input module includes a first input terminal and a second input terminal, the voltage input module is configured to receive an alternating current voltage and convert the alternating current voltage into a direct current voltage. The quick start module is coupled to the voltage input module and configured to receive the direct current voltage and convert the direct current voltage into a startup voltage. The control module is coupled to the quick start module and configured to receive the startup voltage and control a load, wherein the quick start module comprises a first resistor and a second resistor connected in series and coupled between the first input terminal and the control module, and a voltage regulating switch connected in parallel with one of the first resistor and the second resistor, when the alternating current voltage is within a threshold range, the voltage regulating switch is turned on to short-circuit the first resistor or the second resistor connected in parallel therewith, thereby increasing the startup voltage and speeding up a startup speed of the control module.

A purpose of this disclosure is to design a low-cost, small-volume driving circuit that achieves a fast startup speed and a low power consumption at a high input voltage.

BRIEF DESCRIPTION OF THE DRAWINGS

The accompanying drawings, which are incorporated herein and form part of the specification, illustrate the present disclosure and, together with the description, further serves to explain the principles of the disclosure and to enable a person skilled in the relevant art(s) to make and use the disclosure.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a", and "an" do not denote a limitation of quantity, but rather denote the presence of at least one of the referenced items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect.

The present disclosure is based on a low-cost, small-volume driving circuit that achieves a fast startup speed and a low power consumption at a high input voltage.

Lamps of the present disclosure include, but are not limited to, light emitting diode (LED) lamps, organic light emitting diode (OLED) lamps, fluorescent lamps, and high intensity discharge (HID) lamps. The LED tube lamp will be taken as an example for detailed description.

Figure 1:
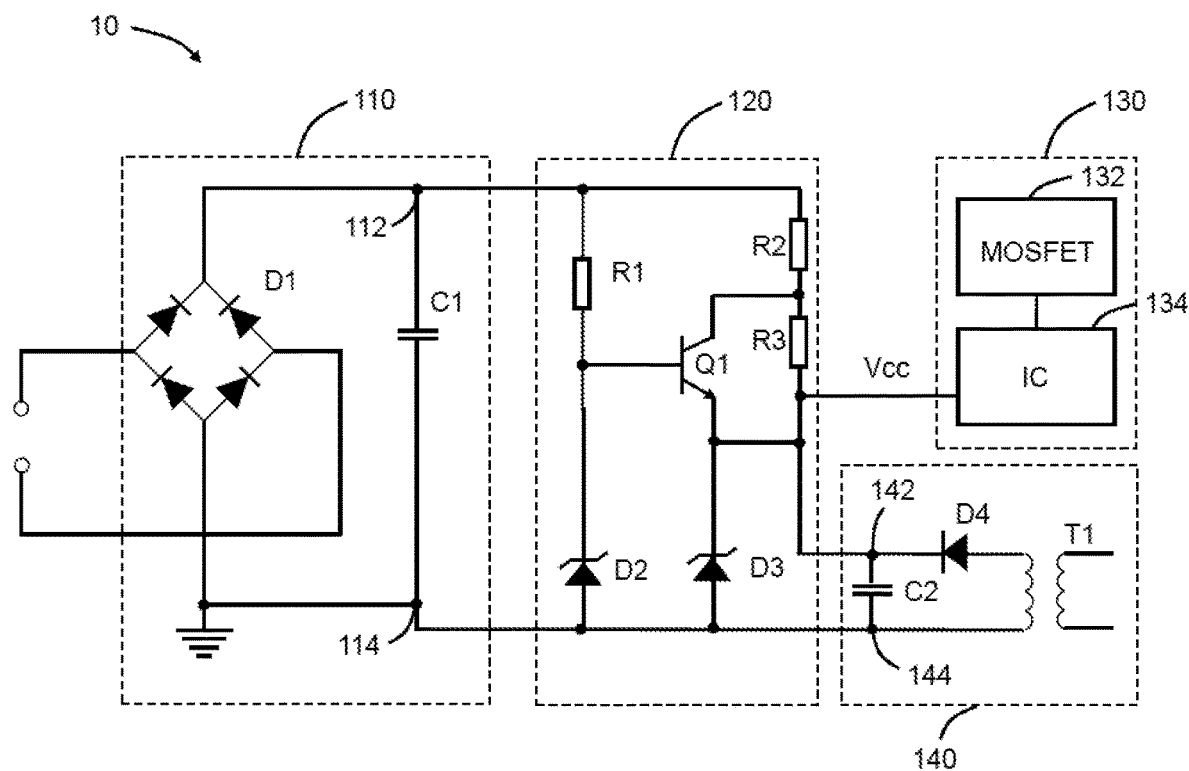
FIG. 1 is a circuit diagram of a driving circuit, in accordance with aspects described herein.

FIG. 1 is a circuit diagram of a driving circuit of the present disclosure. The driving circuit 10 includes a voltage input module 110, a quick start module 120, a control module 130, and a high-frequency power supply module 140. The voltage input module 110 is coupled to both ends of a power supply device (not shown) for receiving an alternating current (AC) voltage of the power supply device and converting the AC voltage to a direct current (DC) voltage. The voltage input module 110 includes a rectifier module and a filter module. In some embodiments, the rectifier module includes a rectifier bridge D1 coupled to both ends of the power supply device, the filter module includes a capacitor C1. The rectifier bridge D1 and the capacitor C1 cooperate to limit and stabilize the received AC power, and to convert the AC voltage into the DC voltage. In other embodiments, the rectifier module and the filter module may also select other circuit connections as would be known to those of ordinary skill in the art. The voltage input module 110 also includes a first input terminal 112 and a second input terminal 114. The quick start module 120 is coupled to the voltage input module 110 for receiving the DC voltage and converting the DC voltage into a startup voltage. The control module 130 is coupled to the quick start module 120 for receiving the startup voltage and controlling a load (not shown). In some embodiments, one end 144 of the high-frequency power supply module 140 is coupled to the second input terminal 114, and the other end 142 is coupled to the control module 130 for performing high-frequency power supply to the control module 130 after the control module 130 is activated. That is, the high-frequency power supply module 140 and the quick start module 120 work together to output Vcc to the control module 130.

Further referring to FIG. 1, in some embodiments, the quick start module 120 includes a voltage regulating switch Q1, a first resistor R2, a second resistor R3, a voltage dividing resistor R1, a first Zener diode D2, and a second Zener diode D3. The voltage dividing resistor R1 and the first Zener diode D2 are connected in series and then coupled to the two ends of the voltage input module 110. A first end of the voltage dividing resistor R1 is coupled to the first input terminal 112, and a second end of the voltage dividing resistor R1 is electrically connected with a cathode of the first Zener diode D2 and then coupled to a base of the voltage regulating switch Q1, and an anode of the first Zener diode D2 is coupled to the second input terminal 114. The first resistor R2 and the second resistor R3 are connected in series, and one end of which is coupled to the first input terminal 112, and the other end is coupled to the control module 130. A collector and an emitter of the voltage regulating switch Q1 are respectively coupled to the two ends of the first resistor R2 or the second resistor R3 in parallel therewith. In this embodiment, the collector and the emitter of the voltage regulating switch Q1 are respectively coupled to the two ends of the second resistor R3, and the emitter of the voltage regulating switch Q1 is coupled to the control module 130. A cathode of the second Zener diode D3 is coupled to the emitter of the voltage regulating switch Q1, and an anode is coupled to the second input terminal 114. In this embodiment, the voltage regulating switch Q1 may be a triode. In some other embodiments, the voltage regulating switch Q1 may also be a metal-oxide semiconductor field effect transistor (MOSFET).

In some embodiments, the control module 130 includes a driving integrated circuit (IC) 134 and a driving switch 132. The driving integrated circuit 134 is configured to receive the Vcc outputted by the high-frequency power supply module 140 and the quick start module 120 and output a control signal. The driving switch 132 is coupled to the driving integrated circuit 134 for receiving the control signal outputted by the driving integrated circuit 134, and controls the load being turned on and off based on a certain law according to the control signal, that is, controls working status of a LED lighting unit (not shown). In some implementations, the driving switch 132 can be a metal-oxide semiconductor field effect transistor (MOSFET).

In some embodiments, the high-frequency power supply module 140 includes a capacitor C2, a diode D4, and a transformer T1. One electrode of the capacitor C2 and the cathode of the diode D4 are electrically connected and then coupled to a connection node of the voltage regulating switch Q1 and the control module 130, and the other electrode of the capacitor C2 is grounded.

In some embodiments, a voltage regulation value of the second Zener diode D3 is greater than a voltage regulation value of the first Zener diode D2, when the power is turned on, the AC voltage received from the power supply device is within a threshold range, a voltage across the second Zener diode D3 is lower than a voltage across the first Zener diode D2. The voltage regulating switch Q1 is turned on to short-circuit the second resistor R3 connected in parallel, so a total resistance value of the first resistor R2 and the second resistor R3 connected in the circuit is only the resistance value of the first resistor R2. At this time, the first resistor R2 charges the capacitor C2, which can increase the startup voltage and speed up the startup speed of the control module 130. In this embodiment, the AC voltage inputted by the power supply deice has a threshold in the range from about 250 volts to about 500 volts. In some specific embodiments, the AC voltage inputted by the power supply deice has a threshold in the range from about 277 volts to about 480 volts.

In some embodiments, after the control module 130 is activated, the high-frequency power supply module 140 begins to supply high frequency power to the control module 130. At this time, the second Zener diode D3 and the capacitor C2 of the high-frequency power supply module 140 are connected in parallel, so the capacitor C2 can charge the second Zener diode D3. Since the voltage regulation value of the second Zener diode D3 is greater than the voltage regulation value of the first Zener diode D2, when the voltage across the second Zener diode D3 is charged to a voltage greater than the voltage across the first Zener diode D2, the voltage regulating switch Q1 is turned off to reconnect the second resistor R3 to the quick start module 120, wherein the second resistor R3 is connected in parallel with the voltage regulating switch Q1. At this time, the total resistance value of the first resistor R2 and the second resistor R3 connected to the circuit is a sum of the resistance values of the first resistor R2 and the second resistor R3, so that current values passing through the first resistor R2 and the second resistor R3 can be reduced. And the power loss in the circuit can be reduced accordingly.

Figure 2:
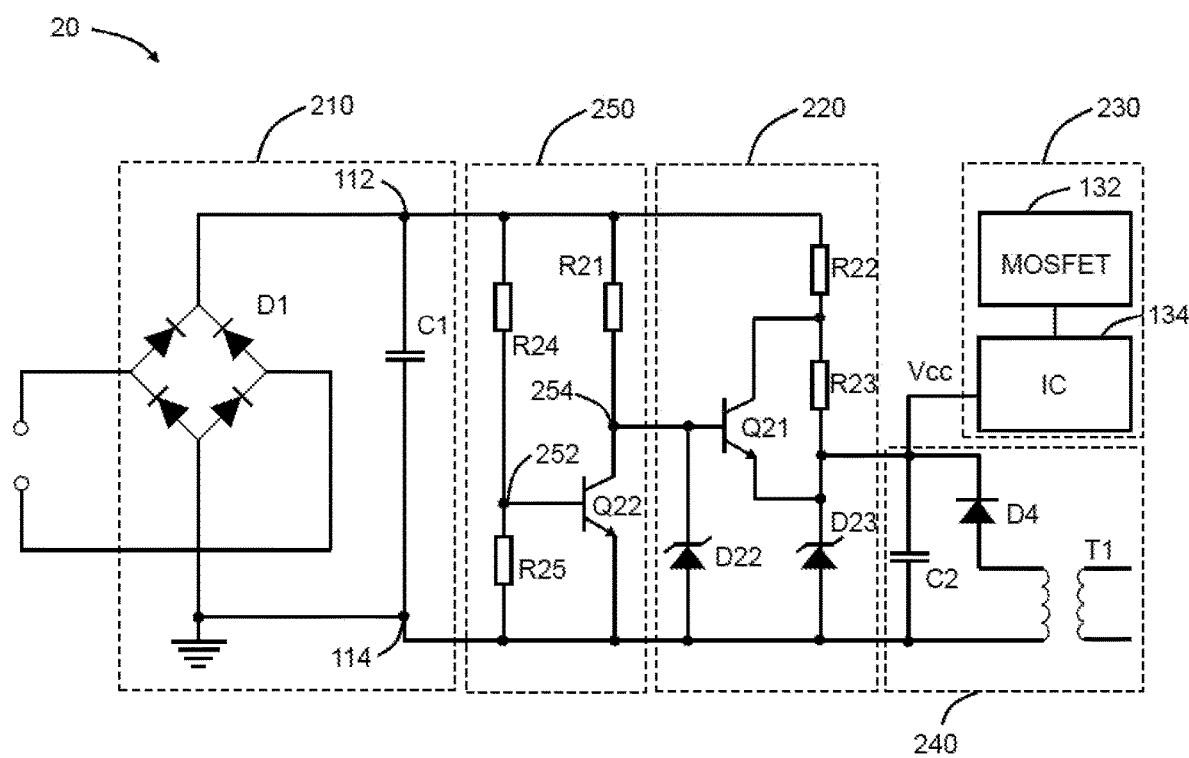
FIG. 2 is a circuit diagram of another driving circuit, in accordance with aspects described herein.

FIG. 2 is a circuit diagram of another the driving circuit of the present disclosure. A driving circuit 20 includes a voltage input module 210, a quick start module 220, a control module 230, a high-frequency power supply module 240, and a voltage control module 250. In some embodiments, the voltage input module 210, the control module 230, and the high-frequency power supply module 240 have the same structure and function as the voltage input module 110, the control module 130, and the high-frequency power supply module 140 in the driving circuit 10 shown in FIG. 1. The descriptions of these modules are not repeated herein, and the components in these modules are also given the same reference numerals as in FIG. 1. In some other embodiments, the voltage input module 210, the control module 230, and the high-frequency power supply module 240 may also be connected by other circuits having the same or similar functions as are known to those having ordinary skill in the art.

As shown in FIG. 2, in some embodiments, the voltage control module 250 is configured to control the "on" and "off" of a voltage regulating switch Q21 according to a voltage value of an AC voltage outputted by a power supply device. The voltage control module 250 includes a control switch Q22 and voltage dividing resistors R21, R24, and R25. The voltage dividing resistors R24 and R25 are connected in series and coupled to both ends of the voltage input module 210, and the voltage dividing resistors R24 and R25 include a connection node 252 therebetween. A first end of the voltage dividing resistor R21 is coupled to the first input terminal 112, and a second end is coupled to a collector of the control switch Q22 to a node 254. An emitter of the control switch Q22 is coupled to the second input 114, and a base is coupled to the node 252. In this embodiment, the control switch Q22 can be a triode. In some other embodiments, the control switch Q22 can also be a metal-oxide semiconductor field effect transistor (MOSFET).

In some embodiments, the quick start module 220 includes a voltage regulating switch Q21, a first resistor R22, a second resistor R23, a first Zener diode D22, and a second Zener diode D23. An anode of the first Zener diode D22 is coupled to the second input terminal 114, a cathode of the first Zener diode D2 is coupled to the node 254 and then connected to the base of the voltage regulating switch Q21. The first resistor R22 and the second resistor R23 are connected in series, and one end of which is coupled to the first input terminal 112, and the other end is coupled to the control module 230. A collector and an emitter of the voltage regulating switch Q21 are respectively coupled to the two ends of the first resistor R22 or the second resistor R23 in parallel therewith. In this embodiment, the collector and the emitter of the voltage regulating switch Q21 are respectively coupled to the two ends of the second resistor R23, and the emitter of the voltage regulating switch Q21 is coupled to the control module 230. A cathode of the second Zener diode D23 is coupled to the emitter of the voltage regulating switch Q21, and an anode is coupled to the second input terminal 114. In this embodiment, the voltage regulating switch Q21 may be a triode. In some other embodiments, the voltage regulating switch Q21 may also be a metal-oxide semiconductor field effect transistor (MOSFET).

In some embodiments, through setting resistance values of the voltage dividing resistors R21, R24, and R25, the voltage control module 250 controls the "on" and "off" of the control switch Q22 according to the AC voltage value outputted by the power supply device, thereby controlling the "on" and "off" of the voltage regulation switch Q21.

Specifically, in one embodiment, when the power is turned on, the AC voltage received from the power supply device is within a threshold range, for example: from 250 volts to 300 volts, that is, a lower voltage value, the control switch Q22 is turned off. In some specific embodiments, the threshold range of the AC voltage received from the power supply device is from 260 volts to 290 volts. In some more specific embodiments, the threshold range of the AC voltage received from the power supply device is from 270 volts to 280 volts. It is known that a voltage regulation value of the second Zener diode D23 is greater than a voltage regulation value of the first Zener diode D22, so a voltage across the second Zener diode D23 is lower than a voltage across the first Zener diode D22, and the voltage regulating switch Q21 is turned on to short-circuit the second resistor R23 connected in parallel. At this time, which can increase the startup voltage and speed up the startup speed of the control module 230. After the control module 230 is activated, the high-frequency power supply module 240 begins to supply high frequency power to the control module 230. At this time, the second Zener diode D23 and the capacitor C2 of the high-frequency power supply module 240 are connected in parallel, so the capacitor C2 can charge the second Zener diode D23. Since the voltage regulation value of the second Zener diode D23 is greater than the voltage regulation value of the first Zener diode D22, when the voltage across the second Zener diode D23 is charged to a voltage greater than the voltage across the first Zener diode D22, the voltage regulating switch Q21 is turned off to reconnect the second resistor R23 to the quick start module 220, wherein the second resistor R23 is connected in parallel with the voltage regulating switch Q21. So that current values passing through the first resistor R2 and the second resistor R3 can be reduced, and the power loss in the circuit can be reduced accordingly.

In another embodiment, when the power is turned on, the AC voltage received from the power supply device is greater than a maximum value of the threshold range, for example: from 400 volts to 500 volts, that is, a higher voltage value, the control switch Q22 is turned on. In some specific embodiments, the threshold range of the AC voltage received from the power supply device is from 470 volts to 490 volts. At this time, the first Zener diode D22 is short-circuit, the voltage regulating switch Q21 is turned off, and the first resistor R22 and the second resistor R23 cooperate to charge the capacitor C2. Since the input AC voltage is large at this time, the current through the first resistor R22 and the second resistor R23 can also quickly charge the capacitor C2, and the startup voltage is increased for a short time without affecting the startup speed of the control module 230, the startup time can still be controlled within one second. At the same time, since the voltage regulating switch Q21 is turned off, the first resistor R22 and the second resistor R23 are simultaneously connected into the circuit, no large power consumption is caused.

As can be seen from the above embodiments, the driving circuit of the present disclosure uses a low-cost and small-volume quick start module with a switching element (triode or MOSFET) under a high input voltage, through the "on" and "off" of the switching element, controlling the series resistance with voltage division effect, and achieving the purpose of fast startup and low power consumption.

While embodiments of the disclosure have been described herein, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

The invention claimed is:

1. A driving circuit comprising:
    a voltage input module comprising a first input terminal and a second input terminal, the voltage input module configured to receive an alternating current voltage and convert the alternating current voltage into a direct current voltage;
    a quick start module coupled to the voltage input module and configured to receive the direct current voltage and convert the direct current voltage into a startup voltage; and
    a control module coupled to the quick start module and configured to receive the startup voltage and control a load;
    wherein the quick start module comprises a first resistor and a second resistor of the quick start module connected in series are coupled between the first input terminal and the control module, and a voltage regulating switch connected in parallel with one of the first resistor and the second resistor, when the alternating current voltage is within a threshold range, the voltage regulating switch is turned on to short-circuit the first resistor or the second resistor connected in parallel therewith, thereby increasing the startup voltage and speeding up a startup speed of the control module, and wherein a base of the voltage regulating switch is coupled to a first Zener diode and an emitter of the voltage regulating switch is coupled to a second Zener diode, the second Zener diode being connected in parallel with a capacitor, wherein a voltage regulation value of the second Zener diode is greater than a voltage regulation value of the first Zener diode.

2. The driving circuit according to claim 1, wherein the voltage input module (110) comprises a rectifier module and a filter module.

3. The driving circuit according to claim 2, wherein the voltage regulating switch comprises a transistor or a metal-oxide semiconductor field effect transistor (MOSFET).

4. The driving circuit according to claim 1, wherein the threshold range of the alternating current voltage is from 277 volts to 480 volts.

5. The driving circuit according to claim 1, further comprising a voltage control module coupled to the voltage input module and configured to control turned-on and turned-off of the regulating voltage based on a voltage value of the alternating current voltage.

6. The driving circuit according to claim 5, wherein the threshold range of the alternating current voltage is from 250 volts to 300 volts.

7. The driving circuit according to claim 6, wherein the voltage control module comprises a control switch, when the alternating current voltage is within the threshold range, the control switch is turned off, and the voltage regulating switch is controlled to be turned on.

8. The driving circuit according to claim 6, wherein the voltage control module comprises a control switch, when the alternating current voltage is larger than a maximum valve of the threshold range, the control switch is turned on, and the voltage regulating switch is controlled to be turned off.

9. A driving circuit comprising:
    a voltage input module comprising a first input terminal and a second input terminal, the voltage input module configured to receive an alternating current voltage and convert the alternating current voltage into a direct current voltage;
    a quick start module coupled to the voltage input module and configured to receive the direct current voltage and convert the direct current voltage into a startup voltage;
    a control module coupled to the quick start module and configured to receive the startup voltage and control a load; and
    a high-frequency power supply module configured to supply high-frequency power to the control module after the control module is activated, one end of the high-frequency power supply module coupled to the second input terminal, and the other end of high-frequency power supply module coupled to the control module;
    wherein the quick start module comprises a first resistor and a second resistor of the quick start module connected in series are coupled between the first input terminal and the control module, and a voltage regulating switch connected in parallel with one of the first resistor and the second resistor, when the alternating current voltage is within a threshold range, the voltage regulating switch is turned on to short-circuit the first resistor or the second resistor connected in parallel therewith, thereby increasing the startup voltage and speeding up a startup speed of the control module.

10. The driving circuit according to claim 9, wherein when the high-frequency power supply module starts to supply high-frequency power to the control module, the voltage regulating switch turns off to re-access the first resistor or the second resistor connected in parallel therewith in the quick start module.

\* \* \* \* \*